(12) United States Patent
Alberth, Jr. et al.

(10) Patent No.: US 9,930,125 B2
(45) Date of Patent: *Mar. 27, 2018

(54) METHODS FOR COORDINATING COMMUNICATIONS BETWEEN A PLURALITY OF COMMUNICATION DEVICES OF A USER

(71) Applicant: Google Technology Holdings LLC, Mountain View, CA (US)

(72) Inventors: William P. Alberth, Jr., Prairie Grove, IL (US); Kevin L. Baum, Rolling Meadows, IL (US); Dean E. Thorson, Grayslake, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/238,816

(22) Filed: Aug. 17, 2016

(65) Prior Publication Data

US 2016/0359985 A1   Dec. 8, 2016

Related U.S. Application Data

(63) Continuation of application No. 13/461,234, filed on May 1, 2012, now Pat. No. 9,438,642.

(51) Int. Cl.
*G06F 15/16* (2006.01)
*H04L 29/08* (2006.01)
(Continued)

(52) U.S. Cl.
CPC ............ *H04L 67/148* (2013.01); *H04L 51/14* (2013.01); *H04L 65/1083* (2013.01);
(Continued)

(58) Field of Classification Search
None
See application file for complete search history.

(56) References Cited

U.S. PATENT DOCUMENTS 4,881,123 A   11/1989   Chapple
5,469,307 A   11/1995   Yamada et al.
(Continued)

FOREIGN PATENT DOCUMENTS

EP   1991018   11/2008
GB   2470243   11/2010
(Continued)

OTHER PUBLICATIONS

"Advisory Action", U.S. Appl. No. 13/461,234, dated Jan. 26, 2015, 3 pages.
(Continued)

*Primary Examiner* — Brian Whipple
(74) *Attorney, Agent, or Firm* — Colby Nipper

(57) ABSTRACT

A communication device performs a method for coordinating communications between a plurality of communication devices of a user. The method includes detecting an active communication session on a primary communication device having user engagement, and determining a set of secondary communication devices in proximity to the user. The method further includes detecting an interruption event, at the primary communication device, during the active communication session. Additionally, the method includes determining that a first secondary communication device, in the set of secondary communication devices, has capability to process the interruption event, and transferring the interruption event to the first secondary communication device.

20 Claims, 5 Drawing Sheets

(51) Int. Cl.
  *H04L 29/06* (2006.01)
  *H04W 4/02* (2018.01)
  *H04M 3/42* (2006.01)
  *H04W 4/20* (2018.01)
  *G06Q 10/10* (2012.01)
  *H04L 12/58* (2006.01)

(52) U.S. Cl.
  CPC .......... *H04L 67/142* (2013.01); *H04L 67/303* (2013.01); *H04M 3/42263* (2013.01); *H04M 3/42374* (2013.01); *H04W 4/02* (2013.01); *H04W 4/021* (2013.01); *G06Q 10/10* (2013.01); *H04L 51/20* (2013.01); *H04M 2203/2094* (2013.01); *H04W 4/206* (2013.01)

(56) References Cited

U.S. PATENT DOCUMENTS

| | | |
|---|---|---|
| 5,584,052 A | 12/1996 | Gulau et al. |
| 6,459,911 B1 | 10/2002 | Hijii |
| 6,470,197 B1 | 10/2002 | Tuoriniemi et al. |
| 6,594,632 B1 | 7/2003 | White |
| 6,874,127 B2 | 3/2005 | Newell et al. |
| 6,970,752 B1 | 11/2005 | Lim et al. |
| 7,110,799 B1 | 9/2006 | Willins et al. |
| 7,177,952 B1 | 2/2007 | Wurch et al. |
| 7,224,992 B2 | 5/2007 | Patino et al. |
| 7,254,420 B1 | 8/2007 | Klein |
| 7,382,771 B2 | 6/2008 | Leblanc et al. |
| 7,584,290 B2 | 9/2009 | Ruskin et al. |
| 7,620,432 B2 | 11/2009 | Willins et al. |
| 7,643,642 B2 | 1/2010 | Patino et al. |
| 7,707,292 B2 | 4/2010 | Henderson et al. |
| 7,813,696 B2 | 10/2010 | Kim |
| 7,983,722 B2 | 7/2011 | Lowles et al. |
| 8,073,137 B2 | 12/2011 | Weinans et al. |
| 8,081,612 B2 | 12/2011 | Want et al. |
| 8,095,081 B2 | 1/2012 | Vance |
| 8,280,038 B2 | 10/2012 | Johnson et al. |
| 8,621,071 B1 | 12/2013 | Scofield et al. |
| 8,634,534 B1 | 1/2014 | Brandt et al. |
| 8,665,847 B2 | 3/2014 | Holostov et al. |
| 8,909,173 B2 | 12/2014 | Harmke |
| 9,438,642 B2 | 9/2016 | Alberth et al. |
| 9,560,108 B2 | 1/2017 | Salkintzis |
| 2003/0046401 A1 | 3/2003 | Abbott et al. |
| 2003/0083061 A1 | 5/2003 | Robinson et al. |
| 2004/0153708 A1 | 8/2004 | Joshi et al. |
| 2005/0251823 A1 | 11/2005 | Saarikivi |
| 2006/0153198 A1 | 7/2006 | Chadha |
| 2007/0064684 A1 | 3/2007 | Kottilingal |
| 2007/0113081 A1 | 5/2007 | Camp |
| 2007/0167174 A1 | 7/2007 | Halcrow et al. |
| 2007/0266135 A1 | 11/2007 | Friedland et al. |
| 2008/0019522 A1 | 1/2008 | Proctor |
| 2008/0108301 A1 | 5/2008 | Dorenbosch |
| 2008/0204543 A1 | 8/2008 | Ferren et al. |
| 2008/0319827 A1 | 12/2008 | Yee et al. |
| 2009/0024760 A1 | 1/2009 | Saha et al. |
| 2009/0094283 A1 | 4/2009 | Baudisch et al. |
| 2009/0132712 A1 | 5/2009 | P et al. |
| 2009/0138609 A1 | 5/2009 | Anderson et al. |
| 2009/0288139 A1 | 11/2009 | Huber et al. |
| 2009/0307511 A1 | 12/2009 | Fiennes et al. |
| 2010/0041447 A1 | 2/2010 | Graylin |
| 2010/0054493 A1 | 3/2010 | Lin et al. |
| 2010/0161813 A1 | 6/2010 | Avasarala |
| 2010/0169446 A1 | 7/2010 | Linden et al. |
| 2010/0290444 A1 | 11/2010 | Souissi et al. |
| 2010/0330997 A1 | 12/2010 | Lee |
| 2011/0149928 A1 | 6/2011 | Wu et al. |
| 2011/0222516 A1 | 9/2011 | Kurose et al. |
| 2011/0263303 A1 | 10/2011 | Lowles et al. |
| 2011/0286437 A1 | 11/2011 | Austin et al. |
| 2012/0044354 A1 | 2/2012 | Cheng et al. |
| 2012/0057456 A1 | 3/2012 | Bogatin et al. |
| 2012/0083256 A1 | 4/2012 | Sperling et al. |
| 2012/0093009 A1 | 4/2012 | Wang et al. |
| 2012/0134309 A1 | 5/2012 | Sakai |
| 2012/0136942 A1 | 5/2012 | Amidon et al. |
| 2012/0178370 A1 | 7/2012 | George |
| 2012/0214549 A1 | 8/2012 | Philbin |
| 2012/0257536 A1 | 10/2012 | Kholaif et al. |
| 2013/0094485 A1 | 4/2013 | Jiang et al. |
| 2013/0097657 A1 | 4/2013 | Cardamore et al. |
| 2013/0170432 A1 | 7/2013 | O'Brien et al. |
| 2013/0182693 A1 | 7/2013 | Sperling et al. |
| 2013/0195283 A1 | 8/2013 | Larson et al. |
| 2013/0215740 A1 | 8/2013 | Tse et al. |
| 2013/0263048 A1 | 10/2013 | Shimizu |
| 2013/0297704 A1 | 11/2013 | Alberth et al. |
| 2013/0301482 A1* | 11/2013 | Katis ................. H04L 29/06176 370/276 |
| 2014/0010135 A1 | 1/2014 | Navda et al. |
| 2014/0075011 A1 | 3/2014 | Salkintzis |
| 2014/0105003 A1 | 4/2014 | Austin et al. |
| 2015/0092954 A1 | 4/2015 | Coker et al. |

FOREIGN PATENT DOCUMENTS

| | | |
|---|---|---|
| WO | WO-2006017330 | 2/2006 |
| WO | WO-2006060115 | 6/2006 |
| WO | WO-2007092623 | 8/2007 |
| WO | WO-2010053345 | 5/2010 |
| WO | WO-2010121205 | 10/2010 |

OTHER PUBLICATIONS

"An-1432 The LM4935 Headset and Push-Button Detection Guide", Texas Instruments Incorporated—http://www.ti.com/lit/an/snaa024a.snaa024a.pdf, May 2013, 8 pages.

"Earbud with Push-to-Talk Microphone", Motorola, Inc., model 53727, iDEN 2.5 mm 4-pole mono PTT headset NNTNN5006BP, 2013, 10 pages.

"Final Improvement Proposal for PTT Support in HFP", Bluetooth SIG, Inc., revision V10r00 (PTTinHFP_FIPD), Jul. 20, 2010, 50 pages.

"Final Office Action", U.S. Appl. No. 13/461,234, dated Jul. 10, 2015, 23 pages.

"Final Office Action", U.S. Appl. No. 13/613,673, dated Mar. 11, 2016, 22 pages.

"Final Office Action", U.S. Appl. No. 13/641,234, dated Nov. 4, 2014, 21 pages.

"Final Office Action", U.S. Appl. No. 14/068,309, dated Apr. 7, 2016, 11 pages.

"International Preliminary Report on Patentability", Application No. PCT/US2013/055237, dated Mar. 26, 2015, 7 pages.

"International Preliminary Report on Patentability", Application No. PCT/US2013/038577, dated Nov. 13, 2014, 7 pages.

"International Search Report and the Written Opinion", Application No. PCT/US2014/045755, dated Oct. 23, 2014, 11 pages.

"International Search Report and the Written Opinion", Application No. PCT/US2013/038577, dated Sep. 17, 2013, 9 Pages.

"International Search Report and the Written Opinion", Application No. PCT/US2013/055237, dated Dec. 9, 2013, 9 Pages.

"Motorola SJYN0505A Stereo Push to Talk Headset for Nextel", Motorola Inc., iDEN 5-pole 2.5 mm Stereo Headset SJYN05058A, 2010, 2 pages.

"MSF White Paper on Service Continuity (IUT)", MSF-TR-Services-003 Final, 2009, 21 pages.

"Non-Final Office Action", U.S. Appl. No. 13/461,234, dated Jan. 12, 2016, 27 pages.

"Non-Final Office Action", U.S. Appl. No. 13/461,234, dated Mar. 6, 2015, 28 pages.

"Non-Final Office Action", U.S. Appl. No. 13/461,234, dated Jul. 23, 2014, 23 pages.

(56) References Cited

OTHER PUBLICATIONS

"Non-Final Office Action", U.S. Appl. No. 13/613,673, dated Jul. 30, 2015, 15 pages.
"Non-Final Office Action", U.S. Appl. No. 14/068,309, dated Oct. 2, 2015, 14 pages.
"Notice of Allowance", U.S. Appl. No. 13/461,234, dated Apr. 29, 2016, 8 pages.
Baldauf,"A Survey on Context-Aware Systems", Int J. Ad Hoc and Ubiquitous Computing, vol. 2, No. 4, 2007, pp. 263-277.
Boutabia,"SESSAMO: Session Mobility for Video Streaming Applications", International Journal of UBICOMP (IJU), vol. 2, No. 2, Apr. 2011, 16 pages.
De"MPEG-21 Session Mobility for Heterogeneous Devices", EUROMEDIA '2004: 10th Annual Euromedia Conference. p. 61-67, 2004, 7 pages.
De"MPEG-21 Session Mobility on Mobile Devices", ICOMP '05 Proceedings of the 2005 International Conference on Internet Computing, Las Vegas, NV, Jun. 27, 2005, pp. 287-293.
Mate,"Movable-Multimedia: Session Mobility in Ubiquitous Computing Ecosystem", MUM '06 Proceedings of the 5th International Conference on Mobile and Ubiquitous Multimedia, ACM New York, NY, 2006, 5 pages.
Thakolsri,"Session Mobility: Service Continuity Across Terminals", Collaboration Projects, NTT DoCoMo Technical Journal, vol. 8, No. 4., Jan. 2007, pp. 59-62.
"Corrected Notice of Allowance", U.S. Appl. No. 13/613,673, dated Dec. 30, 2016, 2 pages.
"Corrected Notice of Allowance", U.S. Appl. No. 13/613,673, dated Dec. 1, 2016, 2 pages.
"Notice of Allowance", U.S. Appl. No. 13/613,673, dated Sep. 16, 2016, 16 pages.

\* cited by examiner

METHODS FOR COORDINATING COMMUNICATIONS BETWEEN A PLURALITY OF COMMUNICATION DEVICES OF A USER

FIELD OF THE DISCLOSURE

The present disclosure relates generally to communications using a plurality of communication devices of a user and, in particular, to methods for coordinating communications between the plurality of communication devices of the user.

BACKGROUND

In recent years, people (i.e., users) oftentimes are equipped with multiple communication devices, such as tablet computers, smartphones, set-top boxes, and laptop computers. These communication devices allow users to access different types of information and to communicate with other people over one or more communication networks. Furthermore, these communication devices generally provide multiple capabilities. For example, a smartphone enables its user to engage in voice conversations, watch video clips, and receive and send text messages. In another example, a tablet computer allows its user to browse the Internet, watch video clips, process E-mails, and engage in voice conversations.

In addition, one function or communication (e.g., watching an online course or movie) can oftentimes be performed by multiple communication devices. For example, a user can watch a video clip on either his smartphone or tablet computer. When two or more (i.e., multiple or a plurality) of these communication devices are near or in proximity to a user, the user may receive multiple communications or communication events on one or more of the communication devices.

Accordingly, there is a need for methods for coordinating communications between a plurality of communication devices of a user.

BRIEF DESCRIPTION OF THE DRAWINGS

The accompanying figures, where like reference numerals refer to identical or functionally similar elements throughout the separate views, together with the detailed description below, are incorporated and form part of the specification and serve to further illustrate various embodiments of concepts that include the claimed invention, and to explain various principles and advantages of those embodiments.

Figure 1:
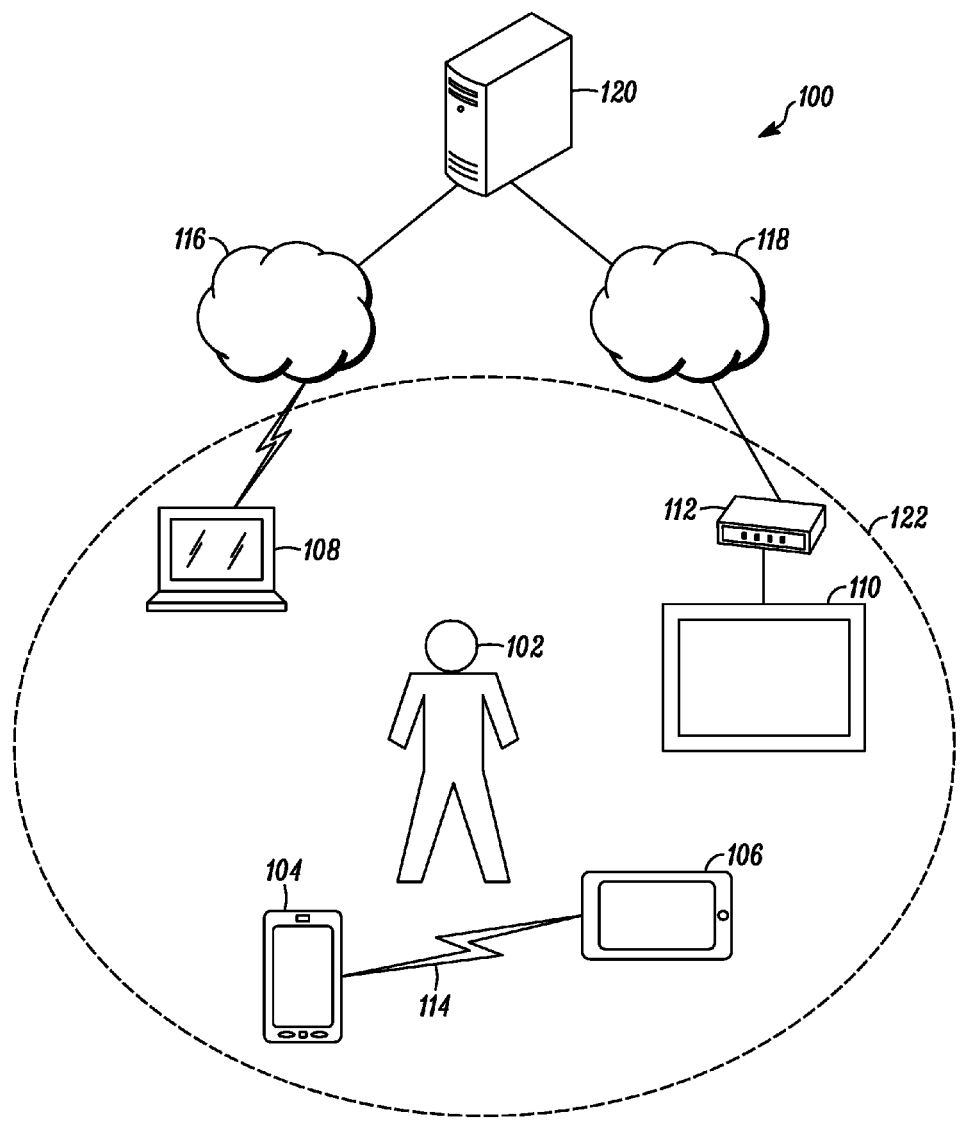
FIG. 1 illustrates a communication system implementing embodiments of the present teachings.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, the present disclosure provides methods for coordinating communications between a plurality of communication devices of a user. In accordance with the present teachings, a method includes detecting an active communication session on a primary communication device having user engagement, and determining a set of secondary communication devices in proximity to the user. The method further includes detecting an interruption event, at the primary communication device, during the active communication session. Moreover, the method includes determining that a first secondary communication device, in the set of secondary communication devices, has capability to process the interruption event, and transferring the interruption event to the first secondary communication device.

Further in accordance with the present teachings, a method for coordinating communications between a plurality of communication devices includes determining that a plurality of communication devices are in proximity to a user, and determining a primary communication device of the plurality of communication devices, wherein the primary communication device is in focus of the user and is engaged in a communication event, wherein the remaining communication devices in the plurality are secondary communication devices. The method further includes receiving an interruption event for the primary communication device, and transferring the interruption event to one of the secondary communication devices determined to have capability to process the interruption event. Moreover, the method includes receiving context information from the primary communication device for the communication event, and receiving an indication of a new primary communication device in focus of the user, wherein the new primary communication device is one of the secondary communication devices. Additionally, the method includes transferring the context information to the new primary communication device to enable the new primary communication device to engage in the communication event.

Further in accordance with the present teachings, a method for coordinating communications between a plurality of communication devices of a user includes determining that a secondary communication device is in proximity to the user and that a primary communication device is in focus of the user, and receiving an interruption event from the primary communication device. The method further includes receiving and storing context information for a communication session on the primary communication device, and detecting that the secondary communication device is in focus of the user. Moreover, the method includes continuing the communication session on the secondary communication device using the context information.

Referring now to the drawings, and in particular FIG. 1, an illustrative communication system implementing embodiments in accordance with the present teachings is shown and indicated generally at 100. As shown, communication system 100 comprises: five communication devices 104-112 (including a smartphone, a tablet computer (or tablet for short), a laptop computer (or laptop for short), a television, and a set-top box, respectively) in "proximity" 122 to a user 102; a server 120; and two networks 116 and 118. The term "proximity" to a user is described in detail below by reference to the remaining figures.

Only a limited number of networks 116 and 118 and system elements 104 to 112 and 120 are shown for ease of illustration; but additional or fewer such networks and/or elements may be included in the system 100. For example, in an alternative arrangement, system 100 does not include the server 120, and methods in accordance with embodiments of the present disclosure are only performed by the communication devices, e.g., methods 200 and 500. In another alternative arrangement, the communication devices in proximity to the user include only a subset of the communication devices 104-112 or include other types of communication devices such as MP3 players or Personal Digital Assistants (PDAs), by way of example. Moreover, other components needed for a commercial embodiment of the system 100 are omitted from the drawing for clarity in describing the enclosed embodiments. For example, one or more wireless network access points or routers (not shown) may be included within the system 100 to facilitate accessing wireless networks 116 and/or 118.

Networks 116 and 118 have a number of infrastructure devices such as base stations, and the like, (not shown) which facilitate communications by and between the server 120 and one or more of the communication devices 104-112 using network links. Networks 116 and 118 can be wired or wireless and can implement any suitable technologies (e.g., 3rd Generation (3G), Long Term Evolution (LTE), WiFi, Gigabit Ethernet (GbE), etc.) or protocols depending at least in part on the type of communications or media (e.g., voice, data, video, text, etc.) being sent over the network.

As shown, the server 120 communicates with the laptop 108 over the network 116 and with the set-top box 112 over the network 118 to provide or exchange information or indications. Such information or indications include, but is not limited to: media, communication device capabilities, proximity information, state of use of a communication device, state of network connection of a communication device, whether a communication device is a primary or a secondary communication device, interruption events, state or context information for a communication session, etc., which can be used to implement one or more methods in accordance with the present teachings.

The communication devices 108 and 112 may further communicate with each other directly or indirectly (e.g., via the server 120 or an auxiliary device) over the networks 116 and 118 using network links to exchange at least some of the above-mentioned information. In another embodiment, two or more of the communication devices communicate directly using a local communication link, e.g., 114, such as a Bluetooth link, a Universal Serial Bus (USB) link, etc., to exchange at least some of the above-mentioned information. As used herein, a network link uses resources of a network (which includes network infrastructure devices). Whereas, local communication links are links formed between communication devices without the use of network infrastructure.

In one illustrative implementation, the server 120 hosts one or more applications such as video streaming, text messaging services, etc., and is also configured or adapted to perform methods in accordance with the present teachings. Such methods include, for instance, methods 300 and 400 described by reference to FIG. 3 and FIG. 4, respectively. The methods can be performed by a single server or distributed across multiple servers.

At least some of the communication devices 104-112 are also configured or adapted to perform methods in accordance with the present teachings. Such methods include, for instance, methods 200 and 500 described by reference to FIG. 2 and FIG. 5, respectively. The methods can be performed by a single communication device or distributed across multiple communication devices (such as a communication device and an auxiliary device). The communication devices enable the user to receive one or more types of media either by having a set (i.e., one or more) of capabilities and interfaces that allow presenting or displaying the media to the user or by performing network connection or bridging capabilities for another communication device.

A communication device can be a primary communication device, a secondary communication device or an auxiliary device. A primary communication device is a communication device that is in proximity to a user and that has user engagement or is in focus of a user. A secondary communication device is any other communication device that is in proximity to the user but that does not have the user engagement or focus. An auxiliary device to another communication device is a device that provides a function for the communication device that is unrelated to displaying media.

For example, the set-top box 112 is an auxiliary device to the television 110, which displays video media. In an example auxiliary function unrelated to the actual display of media, the set-top box 112 connects to the television 110 and bridges communications between the television 110 and the server 120 and other communication devices (e.g., devices 104-108) and systems (e.g., a cable television network, not shown). Furthermore, in another example scenario, the set-top box 112 provides input that can be used to indicate whether the user 102 is in proximity of the television 110 (e.g., a distance measurement indication) and is focused on the television (e.g., a gaze determination input). Other types of auxiliary devices (which may be external to or incorporated within a communication device) include, for example, cameras, remote controls, and different types of sensors such as temperature sensors.

In general, as used herein, the communication devices 104-112 and the server 120 or their hardware being "configured" or "adapted" means that such elements are implemented using one or more (although not shown) memory devices, network interfaces, and/or processing devices that are operatively coupled, and which, when programmed, form the means for these system elements to implement their desired functionality, for example, as illustrated by reference to the methods shown in FIGS. 2-5. The network interfaces are used for passing signaling also referred to herein as messaging (e.g., messages, packets, datagrams, frames, superframes, and the like) containing control information, voice or non-voice media (e.g., text), or other information as mentioned above between the elements of the system 100. The implementation of the network interface in any particular element depends on the particular type of network, i.e., wired and/or wireless, to which the element is connected.

Where the network supports wireless communications, the network interfaces comprise elements including processing, modulating, and transceiver elements that are operable in accordance with any one or more standard or proprietary wireless interfaces, wherein some of the functionality of the processing, modulating, and transceiver elements may be performed by means of the processing device through programmed logic such as software applications or firmware stored on the memory device of the system element or through hardware.

The processing devices utilized by the elements of system 100 may be partially implemented in hardware and, thereby, programmed with software or firmware logic or code for performing functionality described by reference to FIGS. 2-5; and/or the processing devices may be completely implemented in hardware, for example, as a state machine or ASIC (application specific integrated circuit). The memory implemented by these system elements can include short-term and/or long-term storage of various information needed for the functioning of the respective elements. The memory may further store software or firmware for programming the processing device with the logic or code needed to perform its functionality.

Figure 2:
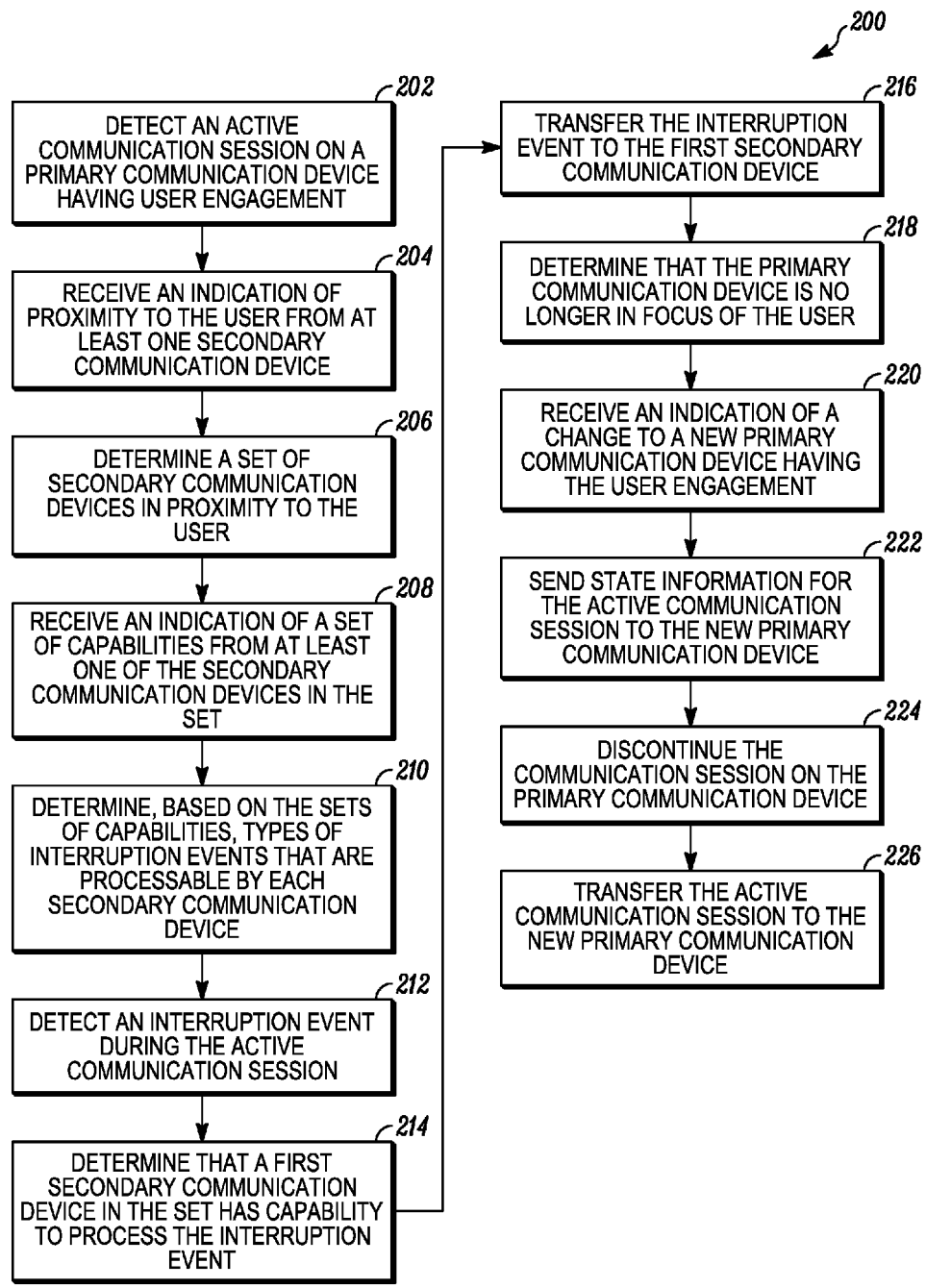
FIG. 2 is a logical flowchart illustrating a method for coordinating communications between a plurality of communication devices of a user in accordance with some embodiments.

We now turn to a detailed description of the functionality of the system 100 elements in accordance with the teachings herein and by reference to the remaining figures. FIG. 2 illustrates a logical flow diagram showing a general method 200 performed by a communication device such as a primary communication device or an auxiliary device. Method 200 begins at 202 with the communication device detecting an active communication session on a primary communication device. An active communication session is defined as an exchange of any type of media. An active communication session is also referred to herein as a communication session or a communication event. Active communication sessions can involve the sending of programming to a television, the sending and receiving of text messages, telephone calls, streaming video over the Internet, etc.

For example, when the user 102 elects to watch an online movie on the tablet 106, a movie watching session occurs between the tablet 106 and a server system (not shown) hosting or providing content of the movie. The tablet 106 detects the active movie watching session when the session is started or ongoing. Active communication sessions can be detected in a variety of ways. For example, a movie watching session can be detected by a movie playback software application that loads and renders the movie to a display device. In another example, a smartphone detects a phone call session by receiving a talk button press or call connection signal.

As stated earlier, a primary communication device is a communication device that is in proximity to a user and that has user engagement or, in other words, is in focus of the user or is being used by the user. Proximity to a user is defined by an area around the user or a distance from or to a user, within which the user can access and use a particular communication device. Thus, proximity to a user depends on the distance between the user and his communication devices. Communication devices are oftentimes equipped with one or more proximity detection components (implemented as hardware and/or software), such as cameras, motion sensors, and temperature sensors. For example, some cameras are capable of detecting the distance between the camera and the user. The detected distance between the camera and the user is used to determine whether the communication device is in proximity to the user. More particularly, when the detected distance is within a proximity threshold, the communication device is deemed to be in proximity to the user. Otherwise, the communication device is not in proximity to the user.

In an embodiment, proximity is dependent or based on a type of the communication device, and the proximity threshold can accordingly be set (e.g., by the manufacturer or the user) based on the type of the communication device. In such a case, two communication devices could be the same distance or within the same area from a user with only one of the communication devices being in proximity to the user. For example, as to a smartphone, proximity to a user may be defined by a smaller area around or distance from the user than for a television. This is because the smartphone is generally only conveniently usable when it is at least within arm's length from the body of the user. By contrast, a television is usually viewable by a user at tens of feet from the user. Thus, if both the smartphone and television are six feet from the user, the proximity threshold for the smartphone would likely be set such that the smartphone was not in proximity to the user at that distance. However, the proximity threshold for the television would likely cause the television to be in proximity to the user at six feet. In yet another example implementation, proximity to a user can be controlled by user preference through the setting of the proximity threshold.

In addition to being in proximity to the user, the primary communication device has user engagement or is in focus of the user, as sensed or otherwise objectively determined by the communication device, an auxiliary device to the communication device, or a server. In one example implementation, user engagement with the primary communication device is determined based on sensing or detecting that the user is interacting with the primary communication device itself. Touch screens, touchpads, buttons, keyboards (or keypads), pointing devices (such as a mouse), remote controls, microphones, and motion sensing devices are a few common means for a device to determine that the user is interacting with a communication device and to, thereby, determine that the primary communication device has user engagement or is in focus of the user.

Where the user engages with the primary communication device by generating input, for example, through an auxiliary device (e.g., a remote control, a keyboard or a touch screen) or by speaking into a microphone of the primary communication device, it can be said that the user engagement is determined based on receiving input from the user. Where the user input, e.g., through a keyboard or touch screen, comprises taking part in a communication session, for instance the user is sending a text message or E-mail or is talking on the smartphone, it can be said that the user is engaged with the active communication session. In this case, user engagement is further determined based on detecting that the user is engaged with the active communication session.

Additionally, the user can engage with the primary communication device by gazing or looking at the primary communication device to view content or media such as a movie on his tablet, a video clip on his smartphone, or a television program on his television. Gazing, retinal, or facial detection capability of a camera allows the primary communication device to detect the user is engaging with, by gazing at, the device. Gazing or retinal detection is an example of where the user engagement is determined based on input from an auxiliary device. In other words, based on input from an auxiliary device (e.g., a gazing or retinal detection device), the primary communication device determines that it has user engagement.

In another example, the set-top box 112, using a camera (not shown), detects the distance between the television 110 and the user 102 to determine that the television 110 is in proximity to the user 102. Moreover, the set-top box 112 utilizes retinal or facial detection to determine that the user 102 is engaged with (in this case watching) the television 110. The set-top box 112, in one embodiment, sends an indication to one or more secondary communication devices in proximity to the user and/or to the server 120, that the television 110 is the primary communication device, since it has detected that the user 102 is engaging with the television 110.

Turning back to method 200, at 204, the communication device receives an indication of proximity to the user from at least one secondary communication device. Proximity can be measured and determined as discussed above. Different from a primary communication device, secondary communication devices of the user are communication devices that are in proximity to the user, but that do not have user engagement and are not in focus of the user. For example, while the user 102 is watching a movie on his tablet 106, the user 102 has his smartphone 104 on his body and laptop 108 next to him. In such a case, the tablet 106 is in focus of and has user engagement from the user 102. Therefore, the tablet 106 is the primary communication device of the user 102. However, the smartphone 104 and the laptop 108 are both in proximity to the user 102, but do not have user engagement and are not in focus of the user 102. Accordingly, in this case, the smartphone 104 and the laptop 108 are secondary communication devices of the user 102.

Based on received indication of proximity to the user from one or more secondary communication devices, at 206, the communication device determines a set of secondary communication devices in proximity to the user. Thus, in this case, determining the set of secondary communication devices in proximity to the user comprises receiving an indication of proximity to the user from at least one of the secondary communication devices in the set.

The indication of proximity can be contained in any suitable message such as a proprietary message or can be inserted as additional information in one or more messages in accordance with a standard communication protocol, already being transmitted between the communication devices. In one embodiment, indication of proximity to the user is sent and received through a network message. For example, while in proximity to the user, a secondary communication device sends periodic network messages (i.e., messages using a network link) to the communication device notifying it that the secondary communication device is in proximity to the user.

Alternatively, the communication device periodically broadcasts its status of being a primary communication device by sending out a broadcast message over one or more networks. Responsive to the broadcast message, secondary communication devices advise, by sending responding network messages, the communication device that they are in proximity to the user. It should be noted that such messages and indications could also be sent using a local communication link 114. In a further embodiment, the messages, sent from the secondary communication devices, indicate the types of the secondary communication device and detected distances between the secondary communication device and the user. In such a case, the primary communication device then, based on the distances and the types of the secondary communication devices, determines whether the secondary communication devices are in proximity to the user.

Reception of these messages indicates to the communication device that it can communicate with the secondary communication devices that sent the messages. Accordingly, it can be said that determining, at 206, the set of secondary communication devices in proximity to the user comprises determining that the communication device is able to or capable of establishing a communication link (either network or local) with the secondary communication device in the set that sent the message. In one embodiment, the communication link is a Bluetooth connection or a network connection on a same subnet. Alternatively, the communication link is established through one or more networking devices (such as routers, switches, and base stations).

At 208, the communication device receives an indication of a set of capabilities from one or more of the secondary communication devices in the set. Similar to the indication of proximity, indication of capabilities can also be communicated in the form of messages sent using network or local communication links. Capabilities of a communication device may include, but are not limited to, screen size, Central Process Unit's (CPU) processing power, available disk space, network connection speed, and supported services or functionalities (such as text messaging, E-mail, and voice). Alternatively, the communication device receives an indication of user preference from one or more of the secondary communication devices in the set.

While the active communication session is ongoing, the communication device may receive interruption events to the active communication session. An interruption event is defined as any second communication session, event, or exchange, or any notification, alarm or other event that is received by or generated for the communication device, which can interrupt the already ongoing communication session or draw the user's attention away from the already ongoing communication session. For example, while the user 102 is watching a movie on the tablet 106, he receives a text message on the same tablet 106. Processing (such as displaying, reading, and responding to) the text message on the tablet 106 will cause interruption to his movie watching experience on the tablet 106. Accordingly, the received text message is an interruption event to the movie watching session on the tablet 106.

An interruption event can be any types of communication events, such as a phone call or an E-mail, among others. Moreover, an interruption event can be other types of events, such as low battery, bad network connection, etc., on the communication device. To avoid interruption to the active communication session on the communication device, it is desirable to transfer the received interruption event to a secondary communication device for processing, if possible. The interruption event can be communicated to the secondary communication device over a local communication link or over a network link either directly or indirectly, e.g., via the server 120. Accordingly, at 210, the communication device determines, e.g., based on the sets of capabilities (received at 208), types of interruption events that are processable by each secondary communication device that provided its set of capabilities.

As used herein, that a type of interruption event is processable by a secondary communication device means that this secondary communication device is configured (i.e., with hardware and perhaps software or firmware) for and capable of processing, including displaying, this type of interruption event. For example, both the tablet 106 and the laptop 108, with large display screens and a network connection, are configured for and capable of receiving, displaying, editing, and sending E-mails. Therefore, E-mail interruption events are processable by both the tablet 106 and the laptop 108. To the contrary, a wrist watch is generally not configured for processing E-mails. Accordingly, E-mail interruption events are not processable by wrist watches.

At 212, the communication device receives or detects an interruption event during the active communication session. At 214, the communication device determines that a first secondary communication device in the set has capability to process the interruption event. Each type of interruption event might be processable by more than one secondary communication device. In such a case, the communication device applies criteria to select the first secondary communication device at 214. For example, the communication device selects the first secondary communication device based on display screen size, display screen color depth, network connection speed, among others. At 216, the communication device transfers the interruption event to the selected first secondary communication device. For example, the communication device sends to the selected first secondary communication device one or more messages that describe and identify the interruption event; or if the interruption event is a message (e.g., text or E-mail), the message itself is sent to the secondary communication device for processing.

At 218, the communication device determines that the primary communication device is no longer in focus of the user. For instance, a motion sensor on the primary communication device detects that the user has put the primary communication device aside. Accordingly, the primary communication device determines that it is no longer in focus of the user because the user has turned his attention away from the primary communication device. In another example use case, a camera attached to the primary communication device detects that the user has walked away from the primary communication device. In one scenario, the user no longer focuses on and turns his attention away from the primary communication device, and turns his attention to and engages with a secondary communication device. This secondary communication device, thereby, becomes a new primary communication device, and notifies the present primary communication device of the change of user engagement.

At 220, the present primary communication device receives the indication of a change to the new primary communication device having the user engagement, from the set of secondary communication devices. Such an indication of user engagement change is sent directly using a network link or a local communication link, or indirectly through a server (e.g., the server 120), from the new primary communication device. The indication of the change to the new primary communication device also allows the present primary communication device to determine that it is no longer in focus of the user.

When a user changes his focus or attention from his primary communication device to a secondary communication device, the present primary communication device is no longer a primary communication device. The secondary communication device that currently is in focus of the user and has user engagement becomes a new primary communication device of the user. For instance, the tablet 106 has user engagement and is in focus of the user 102 when he watches a movie on the tablet 106. Thus, the tablet 106 is a primary communication device of the user 102. However, when the user 102 puts down the tablet 106 and picks up and starts using or interacting with the smartphone 104, the tablet 106 is no longer a primary communication device of the use 102. In this case, the smartphone 104 currently has user engagement and is in focus of the user 102. Accordingly, the smartphone 104 becomes the new primary communication device of the user 102.

Responsive to the indication of a change in user engagement, at 222, the communication device sends state information for the active communication session to the new primary communication device. Alternatively, the communication device periodically sends the state information to each secondary communication device. The state information describes and identifies the active communication session on the primary communication device in a manner that is sufficient to enable the continuation or resumption of the communication session on one or more secondary communication devices, should a change in user focus be detected or determined. For example, for an online movie watching session, the state information may include, but is not limited to, a Uniform Resource Locator (URL) to the online movie and the timestamp inside the movie where the user is watching. In one embodiment, the state information is expressed as an Extensible Markup Language (XML) document. The state information is also interchangeably referred to herein as context information for the active communication session.

At 224, the communication device discontinues the communication session on the primary communication device. For example, the primary communication device stops and terminates an online movie watching session on the primary communication device. At 226, the communication device transfers the active communication session to the new primary communication device. In one embodiment, to transfer the active communication session, the former primary communication device sends, to the new primary communication device, a message indicating that the active communication session has been stopped on the primary communication device, and the new primary communication should immediately resume the communication session using the state information.

Figure 3:
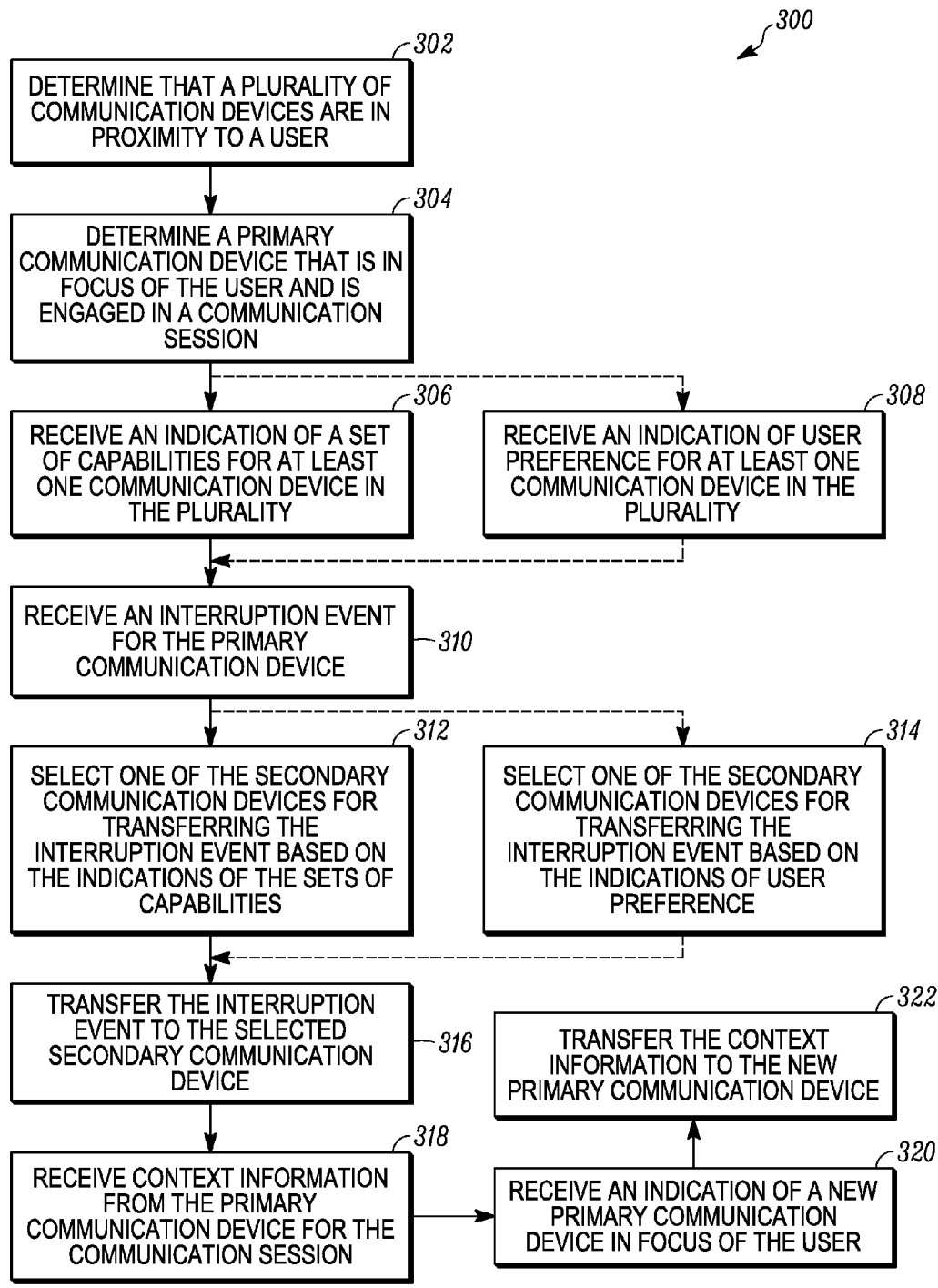
FIG. 3 is a logical flowchart illustrating a method for coordinating communications between a plurality of communication devices of a user in accordance with some embodiments.

Referring now to FIG. 3, a logical flowchart showing a general method 300 for coordinating communications between a plurality of communication devices of a user. In one embodiment, method 300 is performed by a server, such as the server 120. At 302, the server determines that a plurality of communication devices (e.g., the communication devices 104-112) are in proximity to a user (e.g., the user 102). The server makes such determination based on, for example, messages that are periodically sent to the server by each of the plurality of communication devices. Each message indicates to the server that the underlying communication device is in proximity to the user. The plurality of communication devices determine that they are in proximity to the user based on a variety of ways, as described above by reference to the discussion of 202. Alternatively, the messages, sent from the communication devices, indicate the types of the communication device and detected distances between the communication device and the user. In such a case, the server then, based on the distances and the types of the communication devices, determines whether the communication devices are in proximity to the user.

At 304, the server determines a primary communication device that is in focus of the user and that is engaged in a communication session. The primary communication device is one of the plurality of communication devices determined at 302. Thus, the rest or remainder of the plurality of communication devices are deemed or determined to be secondary communication devices. In one embodiment, the server determines the primary communication device based on a message, sent from the primary communication device, indicating that the primary communication device is in focus of the user, and the user is engaged in a communication session (e.g., a movie watching session) on the primary communication device.

Figure 4:
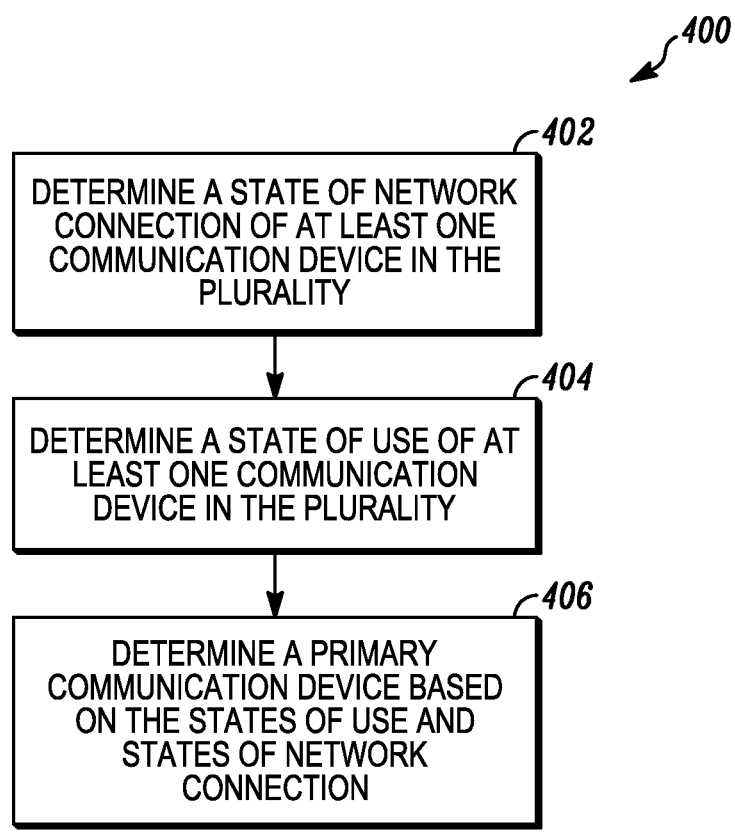
FIG. 4 is a logical flowchart illustrating a method for determining a primary communication device to facilitate coordinating communications between a plurality of communication devices of a user in accordance with some embodiments.

In another embodiment, the server determines the primary communication device using other indicators, such as those illustrated by a method 400 shown in FIG. 4. Referring now to FIG. 4, at 402, the server determines a state of network connection of at least one (and in one implementation each) communication device in the plurality. In one embodiment, the server periodically broadcasts beacon messages. A timely response to a beacon message indicates a high quality network connection between the responding communication device and the server. Failure to respond to a certain number (e.g., three) of beacon messages indicates a broken network connection between the underlying communication device and the server.

Quality of network connection can be determined by various measures, such as network packet latency and rate of network packet loss. The server may deem or determine those communication devices that fail to meet a particular quality of network connection threshold to be secondary communication devices. Alternatively, each communication device periodically sends the server a beacon message. The server's reception of a beacon message indicates a high quality network connection between the server and the sending communication device.

At 404, the server determines a state of use of at least one (and in one implementation each) communication device in the plurality, determined at 302. The state of use of a communication device indicates whether the user is presently engaging with the communication device. For example, each communication device notifies, by sending a message, the server of its state of use. Alternatively, only the communication device having user engagement sends an indication to the server that it currently has user engagement. At 406, the server determines a primary communication device based on the states of use and states of network connection of communication devices in the plurality. For example, the communication device that is being used by the user and has a good network connection is determined to be the primary communication device for the user.

Turning again to the method 300, at 306, the server receives an indication of a set of capabilities for at least some (and in one implementation all) of the communication devices in the plurality. In other words, each of the plurality of communication devices indicates, for example using messages, to the server a set of capabilities of the communication device. In a further embodiment, the server, at 308, receives an indication of user preference for at least one communication device in the plurality. For example, a user may indicate a preference to watch movies on a television and indicate a preference to respond to E-mails on a tablet. Alternatively, the indication of user preference for one or more communication devices in the plurality is programmed into the server. In a further embodiment, the indication of user preference further specifies a rank of user preferences. For example, the indication of user preference may state that a laptop is the most preferred device and a smartphone is the least preferred device to watch a movie, while a tablet ranks between the laptop and the smartphone to perform the same function.

At 310, the server receives an interruption event for the primary communication device. In one embodiment in accordance with the present disclosure, the primary communication device forwards any received interruption events to the server. Responsive to the received interruption event, the server, at 312, selects one of the secondary communication devices for transferring the interruption event based on the indication of the sets of capabilities, received at 306. In a further embodiment, at 314, the server selects one of the secondary communication devices for transferring the interruption event based on the indications of user preference, received at 308. At 316, the server transfers the interruption event, received at 310, to the selected secondary communication device. It should be noted that, in a further embodiment, the primary communication device can also receive indications of user preferences and rank of user preferences and use those indications, at 214, to select the secondary communication device for transferring an interruption event.

At 318, the server receives context information from the primary communication device for the communication session determined at 304. In one embodiment, the primary communication device periodically (e.g., every thirty seconds) sends the context information to the server. Alternatively, the server requests the context information from the current primary communication device upon receiving the indication of the new primary communication device. In yet another alternative embodiment, upon periodically receiving the context information, the server periodically (either at the same or a different frequency) sends the context information to secondary communication devices. The context information describes and identifies the communication session.

At 320, the server receives an indication of a new primary communication device in focus of the user. For example, when the user starts interacting, such as typing on a keyboard, with a secondary communication device, the secondary communication device is in focus of the user, and has the user engagement. In such a case, the secondary communication device sends, to the server, a network message indicating that the secondary communication device is a new primary communication device. Responsively, at 322, the server transfers the context information, received at 318, to the new primary communication device to resume and continue the communication session on the new primary communication device.

Figure 5:
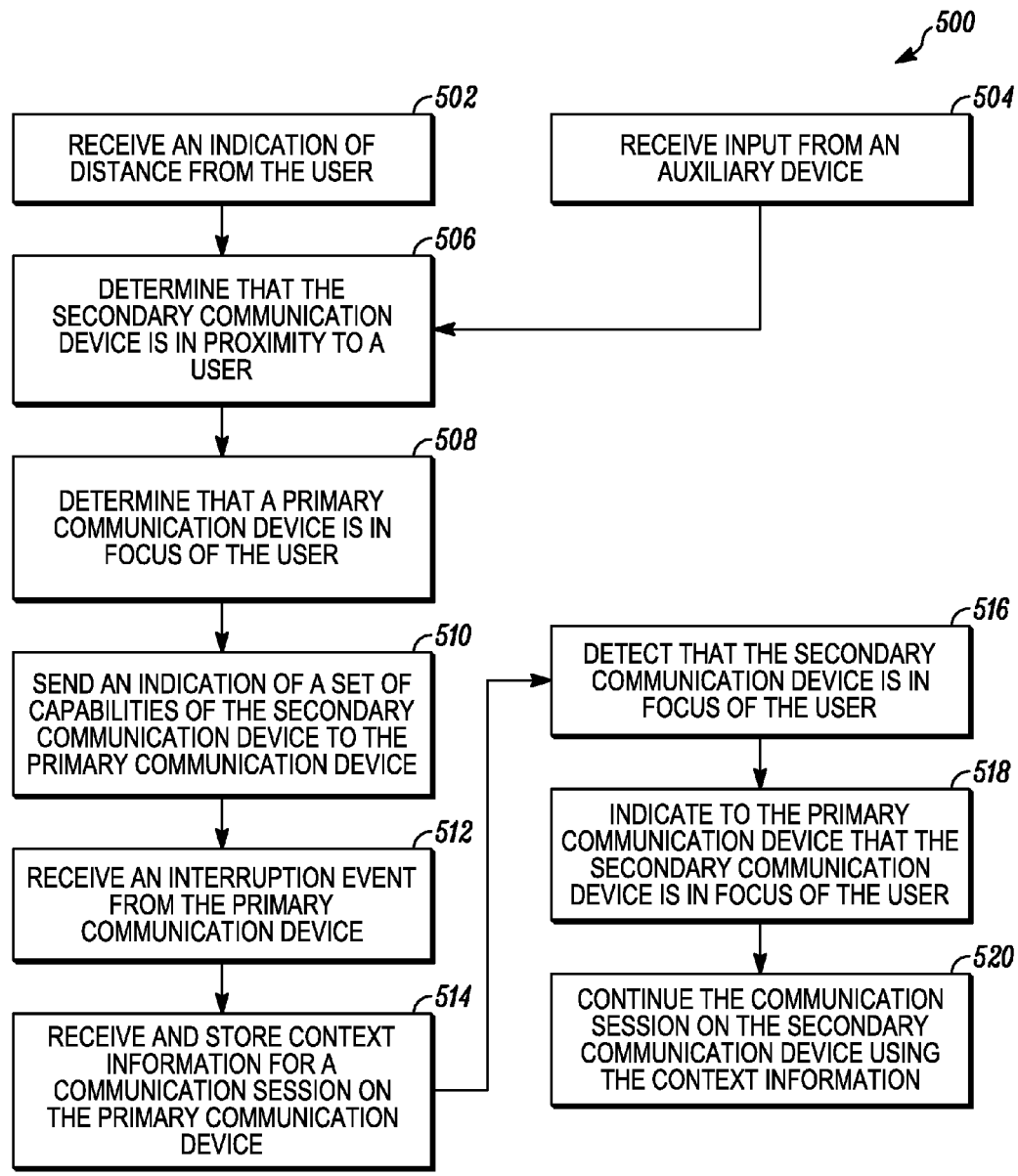
FIG. 5 is a logical flowchart illustrating a method for coordinating communications between a plurality of communication devices of a user in accordance with some embodiments.

Turning now to FIG. 5, a logical flow diagram showing a general method 500 is shown. In one embodiment, method 500 is performed by a secondary communication device. The secondary communication device, at 506, determines that the secondary communication device is in proximity to the user. In one example implementation, proximity to the user is based on a distance of the user to the secondary communication device. For instance, at 502, the secondary communication device receives an indication which provides information regarding distance between the user and the secondary communication device. In one embodiment, the distance between the user and the secondary communication device is detected by a camera hosted by or connected to the secondary communication device. For instance, the tablet 106 can use a camera to detect the distance between the user 102 and the tablet 106.

In another example implementation, proximity to the user is based on an auxiliary device on the secondary communication device sensing the user. For instance, at 504, the secondary communication device receives input from an auxiliary device sensing the user. In one embodiment, the set-top box 112 is equipped with distance detection sensors to detect that the television 110 is in proximity to the user. As an auxiliary device to the television 110, the set-top box 112 sends to the television 110 input indicating that the secondary communication device is in proximity to the user. As described above, proximity to the user can be further based on the type of the secondary communication device, wherein, for instance, a proximity threshold used by the secondary device is set (e.g., by the manufacturer or the user) based on the type of the secondary communication device.

At 508, the secondary communication device determines that a primary communication device is in focus of the user. In one embodiment, the secondary communication device receives, from the primary communication device, a message indicating that the primary communication device is currently in focus of the user. Such an indication of the primary communication device is sent directly, or indirectly through a server (e.g., the server 120), from the primary communication device. Such an indication may also be sent using a local communication link (e.g., the local communication link 114).

At 510, the secondary communication device sends an indication of a set of capabilities of the secondary communication device to the primary communication device. For example, the tablet 106 sends, over a Bluetooth link, to the smartphone 104 a message specifying a set of capabilities of the tablet 106, such as screen size, touch screen, and E-mail support. Alternatively, the tablet 106 sends the set of capabilities of the tablet 106 to the server 120. At 512, the secondary communication device receives, either directly or through a server (e.g., the server 120), an interruption event from the primary communication device. The interruption event is sent to the secondary communication device for processing. The secondary communication device is selected, by the primary communication device or a server, to process and/or display the interruption event based on the set of capabilities sent at 510. Accordingly, it can be said that the interruption event is of a type that is compatible with the set of capabilities of the secondary communication device. In a further embodiment, the secondary communication device is selected based on user preferences.

The secondary communication device, at 514, receives and stores context information, such as the state information sent at 222, for a communication session on the primary communication device. The secondary communication device receives the context information either directly from the primary communication device (e.g., over a Bluetooth connection or via a network link), or indirectly through a server. The secondary communication device, at 516, detects that the secondary communication device is in focus of the user. For example, when the tablet 106 detects that the user 102 is making contact with its touch screen, the tablet 106 determines that it is in focus of the user 102.

The secondary communication device, at 518, indicates to the primary communication device or to a server that the secondary communication device is in focus of the user. For example, the secondary communication device sends such an indication using a message sent over a network link or using a local communication link. Using the context information, received and stored at 514, the secondary communication device, at 520, continues or resumes the communication session on the secondary communication device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method for coordinating communications between the plurality of communication devices of a user as described herein. The non-processor circuits may include, but are not limited to, a radio receiver, a radio transmitter, signal drivers, clock circuits, power source circuits, and user input devices. As such, these functions may be interpreted as steps of a method to perform the coordinating communications between the plurality of communication devices of a user described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a non-transient computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system comprising:
   one or more processing devices;
   one or more non-transient computer-readable storage elements or media having computer readable code stored thereon that, when executed by the one or more processing devices, performs operations that coordinate communications between a plurality of communication devices of a user, the operations comprising:
      detecting an active communication session at the system, the active communication session having user engagement, the system being one of the plurality of communication devices of the user;
      determining a set of secondary communication devices in proximity to the user using one or more proximity detection components;
      detecting an interruption event received at the system during the active communication session, the interruption event including a second communication session or a communication event that is not a part of the active communication session; and
      determining that a first secondary communication device, in the set of secondary communication devices, has capability to process the interruption event, and transferring the interruption event to the first secondary communication device while the active communication session continues on the system.

2. The system of claim 1, wherein the operations further comprise:
   determining that the system no longer has the user engagement; and
   discontinuing the active communication session on the system.

3. The system of claim 1, wherein the operations further comprise:
   receiving an indication of a change to a new primary communication device having the user engagement, the new primary communication device from the set of secondary communication devices; and
   transferring the active communication session to the new primary communication device.

4. The system of claim 1, wherein the operations further comprise sending state information for the active communication session to at least one secondary communication devices in the set of secondary communication devices.

5. The system of claim 1, wherein the operations further comprise receiving an indication of a set of capabilities from at least one secondary communication device in the set of secondary communication devices to determine types of interruption events processable by the at least one secondary communication device.

6. The system of claim 1, wherein the user engagement is determined based on input from an auxiliary device.

7. The system of claim 1, wherein the user engagement is determined based on receiving input from the user.

8. The system of claim 1, wherein the user engagement is determined based on detecting that the user is interacting with the active communication session.

9. The system of claim 1, wherein determining the set of secondary communication devices in proximity to the user comprises receiving an indication of proximity to the user from at least one secondary communication device in the set of secondary communication devices.

10. The system of claim 1, wherein the determining the set of secondary communication devices in proximity to the user comprises determining that the system is capable of establishing a local communication link with at least one secondary communication device in the set of secondary communication devices.

11. The system of claim 1, wherein the active communication session is a media item that is being presented on the system and the interruption event is one of a phone call, an email message, a text message, or a low battery indication.

12. The system of claim 11, wherein the media item is a video or a movie.

13. A system comprising:
   one or more processing devices;
   one or more non-transient computer-readable storage elements or media having computer readable code stored thereon that, when executed by the one or more processing devices, perform operations that coordinate communications between a plurality of communication devices of a user, the operations comprising:
      determining that the system is a primary communication device of a plurality of communication devices in proximity to a user, the system being in focus of the user and engaged in a first communication event, the remaining communication devices of the plurality of communication devices being secondary communication devices;

receiving an interruption event for the system, the interruption event including a second communication event or a communication session that is not a part of the first communication event;

transferring the interruption event to one of the secondary communication devices determined to have capability to process the interruption event and while the system is engaged in the first communication event;

receiving an indication of a new primary communication device in focus of the user, the new primary communication device being another one of the secondary communication devices; and transferring, from the system and to the new primary communication device, context information to enable the new primary communication device to engage in the first communication event.

14. The system of claim 13, wherein the operations further comprise:
receiving indications of respective sets of capabilities for communication devices of the plurality of communication devices; and
selecting the one of the secondary communication devices for transferring the interruption event based on the indications of the sets of capabilities.

15. The system of claim 13, wherein the operations further comprise:
receiving an indication of user preference for at least one communication device of the plurality of communication devices; and
selecting the one of the secondary communication devices for transferring the interruption event based on the indication of user preference.

16. The system of claim 13, wherein the operations further comprise:
determining a state of network connection of at least one communication device of the plurality of communication devices;
determining a state of use of at least one communication device of the plurality of communication devices; and
determining that the system is the primary communication device based on the determined state of network connection of the at least one communication device of the plurality of communication devices and the determined state of use of the at least one communication device of the plurality of communication devices.

17. A system comprising:
one or more processing devices; and
one or more non-transient computer-readable storage elements or media having computer readable code stored thereon that, when executed by the one or more processing devices, perform operations that coordinate communications between a plurality of communication devices of a user of which the system is part, the operations comprising:
receiving an interruption event from a primary communication device and at the system, the interruption event including a second communication session or communication event that is not a part of the first communication session;
processing the interruption event at the system while the primary communication device is engaged in the first communication session;
receiving and storing context information received from, or associated with, the first communication session;
detecting that the system is in focus of the user; and
continuing the first communication session on the system using the context information.

18. The system of claim 17, wherein the operations further comprise sending an indication of a set of capabilities of the system to the primary communication device, the interruption event of a type that is compatible with the set of capabilities of the system.

19. The system of claim 17, wherein the operations further comprise indicating to the primary communication device that the system is in focus of the user.

20. The system of claim 17, wherein the operations further comprising determining, based on a distance of the user to the system, that the system is in focus of the user.

* * * * *